July 27, 1926.

J. WEHMANN

TRAP

Filed Feb. 26, 1926

John Wehmann
INVENTOR

BY Victor J. Evans
ATTORNEY

July 27, 1926.
J. WEHMANN
1,594,287
TRAP
Filed Feb. 26, 1926   2 Sheets-Sheet 2
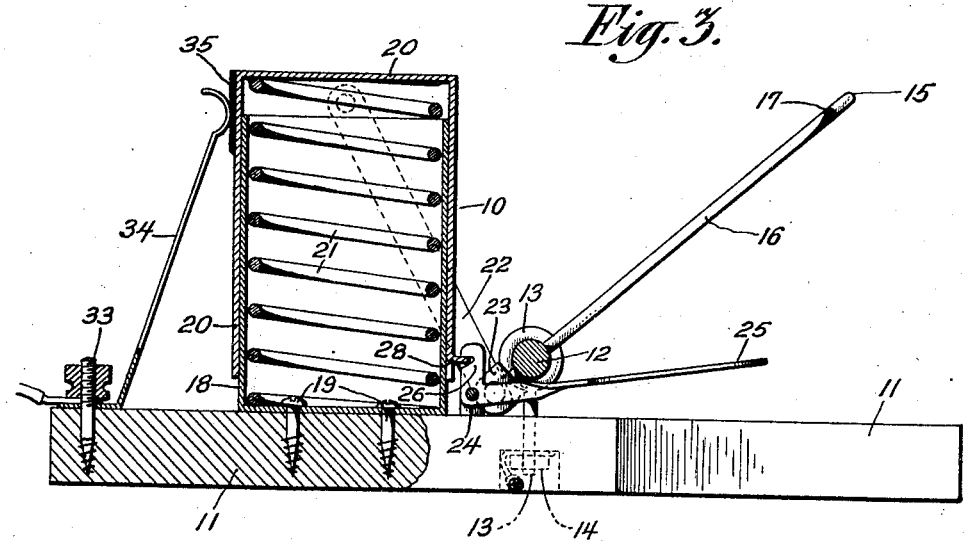
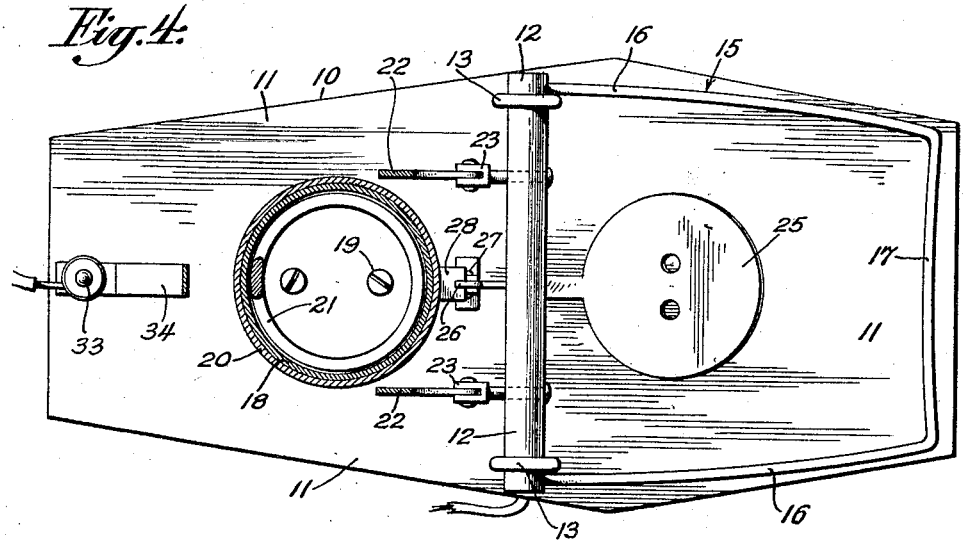
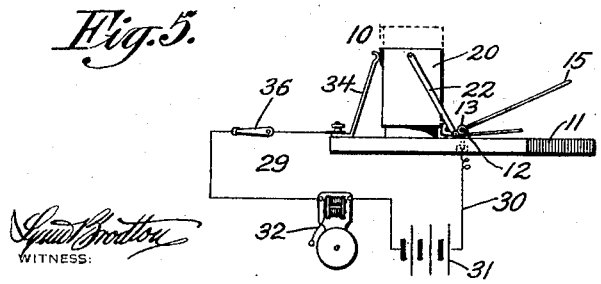
John Wehmann
INVENTOR
BY Victor J. Evans
ATTORNEY Patented July 27, 1926.

1,594,287

UNITED STATES PATENT OFFICE.

JOHN WEHMANN, OF JERSEY CITY HEIGHTS, NEW JERSEY, ASSIGNOR OF ONE-HALF TO BERNHARD WILKENS, OF SECAUCUS, NEW JERSEY.

TRAP.

Application filed February 26, 1926. Serial No. 90,889.

This invention relates to improvements in traps and especially to animal traps for trapping rats and other pests.

The principal object of the invention resides in an animal trap which is capable of operating a suitable signal to indicate to the trapper that the trap has operated and an animal has been caught. The trapper may then go to the trap, remove the trapped animal and reset the same for further use. This provides a humane trap as in many instances, the animal may not be instantly killed by the operation of the trap but may be relieved from suffering and disposed of in any suitable manner.

Another object of the invention is to provide a trap which may be quickly set and which is highly sensitive so as to operate instantly upon the contact of the animal therewith.

A still further object of the invention resides in an animal trap which is simple in construction, easy to set and positive in operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a view similar to Figure 2 but showing the parts in a set position.

Figure 4 is a horizontal sectional view on the line 4—4 of Figure 2.

Figure 5 is a diagrammatic view of the alarm circuit.

Figure 1:
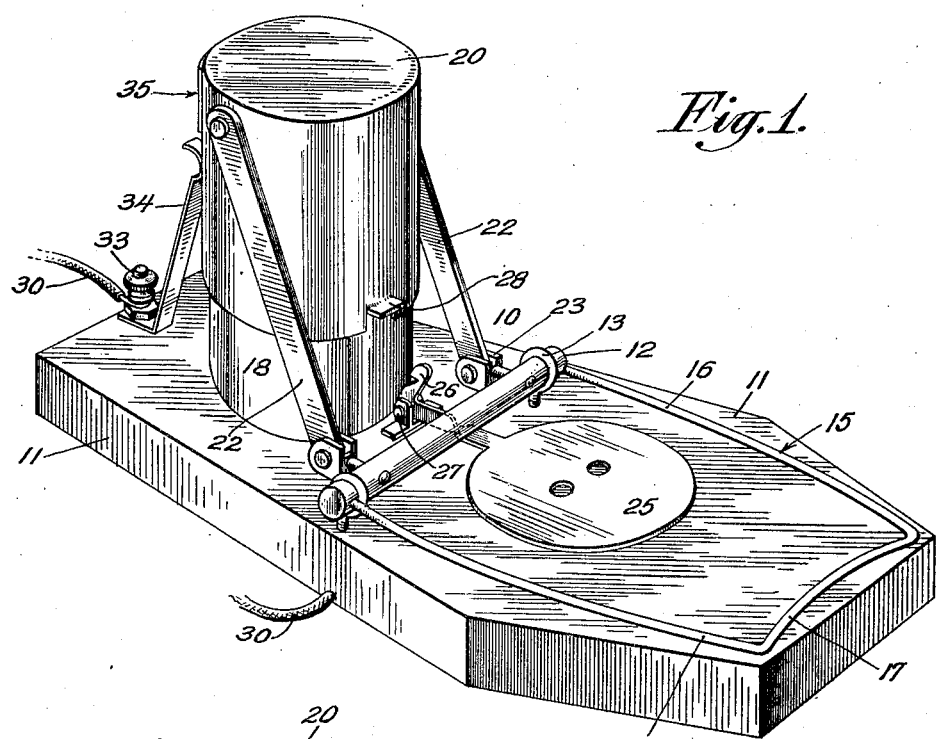
Figure 1 is a perspective view of my improved trap, parts being shown in an unset position.

Referring more particularly to the drawings, the reference numeral 10 designates my improved trap in its entirety and which includes a base 11 which is coffin shape in plan and which supports a transversely disposed shaft 12 mounted in spaced screw eyes 13, the shanks of which pass through the base and are anchored thereto by nuts 14. The eyes 13 serve as bearings for the shaft 12 and extending from the shaft is a jaw 15 constructed of a single piece of relatively stiff wire bent into a substantially U-shape, the legs 16 of which are fixedly connected to the shaft 12, while the bight portion 17 is adapted to hold the trapped animal down against the base 11.

Figure 2:
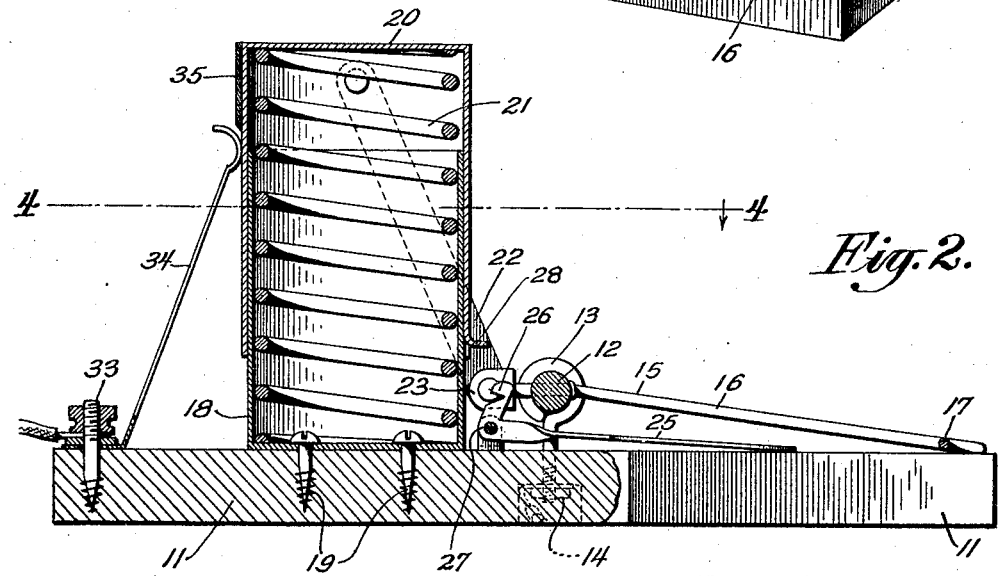
Figure 2 is a vertical longitudinal sectional view therethrough.

For the purpose of swinging the jaw to a raised position, I employ a stationary hollow cylindrical member 18 which is opened at one end and closed at its other end, the closed end being secured to the base 11 by screws or other fastening elements 19. Telescoping the open end of the stationary member 18, is a movable hollow cylindrical member 20 similar to the member 18, which is slightly larger in diameter so as to freely slide over the member 18. A helical spring 21 is enclosed within the hollow members and acts against the end walls of the same. When the parts are in the position shown in Figure 2 of the drawing, the spring is in a neutral position, that is, it is not under tension, but when the movable member is depressed, the spring is placed under tension for the purpose to be presently described. One end of a pair of links 22 are respectively pivoted to diametrical points of the movable member 20 adjacent the top thereof, while the opposite ends of the links are pivotally connected to ears 23 which extend from the shaft 12. It will be seen that when the movable member 20 is depressed, motion will be transmitted to the shaft 12 through the links 22, to rock the shaft which in turn raises the jaw to the position shown in Figure 3 of the drawings.

Having described the means for lifting the jaw to a raised position and for placing the same under tension, I shall now describe the trigger means 24. The trigger means 24 comprises a bait holder 25 on which the bait is adapted to be placed for attracting the animal to the trap. The bait holder is provided with an angularly disposed hook 26 and which holder is pivoted above the base as at 27. The hook 26 is adapted to engage with a shoulder or projection 28 extending from the movable hollow member, and which is in the path of the hook so as to co-act with the same to hold the member 20 in a depressed position and the jaw 15 in a raised position against the tension of the spring.

From the foregoing description, it will be seen that when the hollow member 20 is pushed down against the tension of the spring, the jaw is lifted and parts are held in this position by reason of the hook 26 engaging the projection 28. When in this position, the trap is set and should an animal approach the trap and attempt to nibble at the bait, the trigger means will operate to release the hollow member 20 at which time the action of the spring causes the rapid dropping of the jaw which clamps the animal down upon the base.

For the purpose of notifying a trapper that an animal has been caught, I provide an alarm means 29, which includes an electric circuit 30 in which is arranged a source of energy in the nature of a battery 31 and an electric bell 32. Although I have shown and mentioned a bell within the circuit, it will be appreciated that a suitable light or buzzer may be substituted therefor should it be desired. One wire of the circuit 30 is connected to a binding post 33 mounted on the base 11, and which binding post is electrically connected with a spring contact 34 which rests against the movable cylinder 20. It might be mentioned that the cylinder 20, links 22, shaft 12 and screw eyes 13 are all of a conducting material but the cylinder 20 is provided with an insulated portion 35 to be engaged by the spring contact 34 when the cylinder is in a depressed position. The other wire of the circuit is connected to one of the screw eyes 13 and it will be appreciated that when the trap is in a set position, the circuit is open as the spring contact is in engagement with the insulated portion 35. When the trap is operated, the insulated portion 35 on the cylinder moves upward with the cylinder so as to cause the spring contact to engage the conductive surface of the cylinder which completes the circuit through the links 22, shaft 12 and screw eyes 13. When the circuit is closed, the bell 32 is sounded, thus giving an audible signal. A hand operated switch 36 is arranged in the circuit 30 so that the circuit may be broken irrespective of the position of the hollow member 20.

Although I have specifically mentioned that the device is especially adapted for trapping rats and other pests, the same will be found useful in the trapping of wild or fur bearing animals.

What is claimed as new is:—

1. In a trap, a base member, a spring pressed jaw pivotally mounted upon said base member, means for moving said jaw to a raised position, said means including a pair of telescoping members operatively connected with said jaw, and trigger means for holding said jaw in a raised position upon the actuation of said first means.

2. In a trap, a base member, a spring pressed jaw pivotally mounted upon said base member, means for moving said jaw to a raised position, said means including a pair of telescoping members operatively connected with said jaw, and trigger means for holding said jaw in a raised position upon the actuation of said first means, said trigger means including a bait holder engageable with one of said telescoping members.

3. A trap comprising a base member, a jaw hingedly mounted thereon, a pair of hollow telescoping members, one of said members being rigidly secured to said base member, an expansion spring within said hollow telescoping members, links for operatively connecting said other telescoping member with said jaw, whereby movement of the same to compress said spring will cause said jaw to move to a raised position and subjected to the tension of said spring, and trigger means engageable with said last mentioned telescoping member to hold the same against the action of said spring, whereby releasing of said trigger means will cause said jaw to automatically move into striking engagement with said base member.

4. In a trap, a pivoted jaw, setting means for lifting said jaw to a raised position and for placing the same under tension, said setting means including a pair of telescoping hollow members, a spring within said members and interposed between the ends of the same, and a trigger engageable with one of said members for holding said spring under tension.

5. A trap comprising a base, a jaw hingedly mounted upon said base, a hollow member stationarily mounted upon said base, a movable hollow member telescoping said stationary hollow member, a spring within said members interposed between the end walls of the same, links operatively connecting said movable hollow member with said jaw, whereby movement of said movable hollow member to compress said spring will automatically lift said jaw to a raised position, a bait holder, and co-acting means between said bait holder and said movable hollow member for holding said jaw in a raised position against the tension of said spring.

In testimony whereof I have affixed my signature.

JOHN WEHMANN.